S. W. Huntington,
Shears.
N° 84,695.         Patented Dec. 8, 1868.

Witnesses
Geo. A. Loring.
Edward Griffith

Inventor
S. W. Huntington
by his Attorney
Frederic Curtis.

SAMUEL W. HUNTINGTON, OF AUGUSTA, MAINE.

*Letters Patent No. 84,695, dated December 8, 1868.*

IMPROVEMENT IN SHEARING-MACHINE.

The Schedule referred to in these Letters Patent and making part of the same.

*To all to whom these presents shall come:*

Be it known that I, SAMUEL W. HUNTINGTON, of Augusta, in the county of Kennebec, and State of Maine, have made a new and useful Invention of Certain Improvements in Shears for various purposes; and do hereby declare the following to be a full, clear, and exact description thereof, due reference being had to the accompanying drawings, making part of this specification, and in which—

Figure 1:
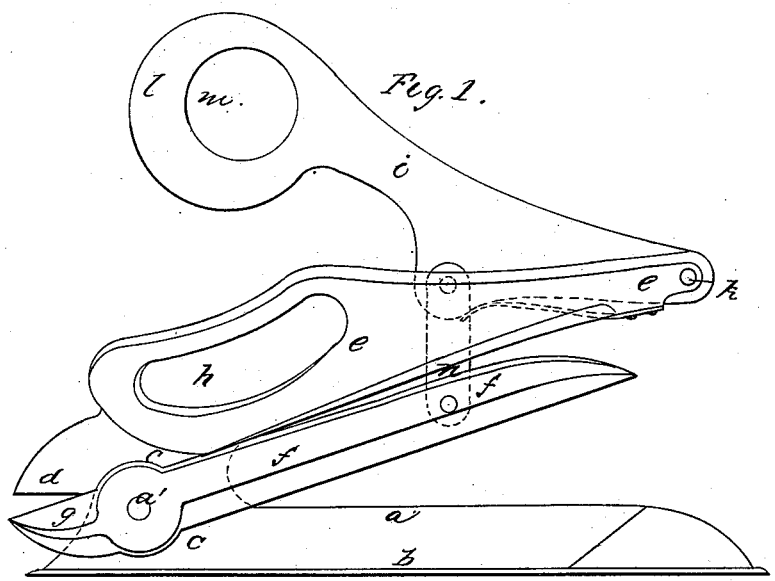

Figure 1 is a side elevation, and

Figure 2:
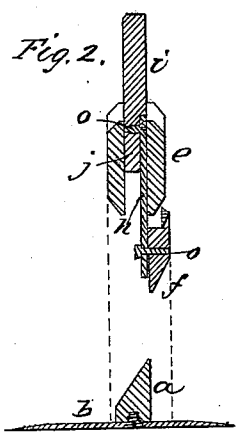

Figure 2, a transverse and vertical section of my invention.

My present invention has reference more particularly to shears for tailors' use, and for cutting metals, wire, &c., where the material to be cut requires the application of a greater amount of power than is the case with ordinary scissors, although the invention possesses details which render their application valuable to scissors or shears of any description, the object of the invention being to construct shears in such manner as to increase, to any desired extent, as well as to vary or adjust, the power applied to the cutting-blades.

The invention consists in the employment of a pair of blades, one being stationary, and one movable, the movable blade being pivoted to the stationary blade, and operated by a lever, which, in turn, is pivoted, at its front end, to a standard or goose-neck, surmounting or making part of the stationary blade, as hereinafter described, the two blades being provided with short auxiliary jaws or blades, for cutting wire, or other hard substances which would tend to injure the primary blades.

In the drawings above mentioned, the stationary and lowermost primary blade of the implement is shown, at $a$, as secured to a broad, flat tablet or base-plate, $b$, this plate serving to support the entire implement upon a table or other object, and allow it to be moved about thereon, with much greater ease, and less fatigue to the operator's hand and arm, than with shears of ordinary construction.

The blade $a$ has an upright extension or post, $c$, near its rear end, such post $c$, furthermore, having a short horizontal branch, $d$, extending rearward from it a short distance, the lower and cutting-edge of this branch, which forms one of the auxiliary blades of the implement, being on a plane somewhat above that of the upper and cutting-edge of the primary blade $a$, as shown in fig. 1 of the accompanying drawings.

The post $c$, before mentioned, in addition to the branch $d$, is extended forward, and over the blade $a$, into a long horizontal arm or goose-neck, $e$, of a length about equal to that of the blade $a$, the space between the goose-neck $e$ and blade $a$ being sufficient to admit of the necessary movements of the movable primary blade, which is shown at $f$ as of a form and length similar to such blade $a$, and fulcrumed, near its rear end, and alongside of the blade $a$, to the post $c$, as shown at $a'$, and in such manner that the upper edge of its rear and shorter arm, $g$, shall form an auxiliary blade, and act in conjunction with the branch $d$, before alluded to, to complete a pair of powerful cutting-blades, for cutting pieces of wire, whalebone, or other hard substances which would injure or ruin the primary blades.

The forward and longer arm of the blade $f$ completes, in combination with the rotary blade $a$, the primary shears.

An eye or opening, $h$, is made laterally through the bend of the goose-neck $e$, for reception of the fingers of a person's hand, and may be said to constitute one of the handles of the implement.

A lever, $i$, surmounts the goose-neck $e$, and extends partially into a slot or aperture, $j$, made in the forward part of such goose-neck, the two being pivoted together at their forward extremities, as represented at $k$, and the former being provided, at its rear end, $l$, with a thumb-hole or orifice, $m$, disposed above the opening $h$, before mentioned, the rear end, $l$, of the said lever $i$ constituting the remaining handle of the implement.

The lever and the movable primary blade $f$ are connected together by a vertical link or rod, $n$, pivoted to them at about their centres, as shown at $o$ $o'$, in the present instance, although their position may be varied, in order to regulate the amount of power applied to the blade $f$, at the same time increasing, in like manner, but in much greater ratio, the cutting-power of the auxiliary blades $d$ and $g$.

In operating with the above-described shears, they are to be placed upon the table or bench, and the tablet or base, $b$, resting thereon, and supporting the cutting-blades in a perpendicular position.

The cloth, metal, or material to be cut, is to be introduced between the blades $a$ and $f$, and the handle or lever $i$, and, with the blade $f$, raised and depressed, with a great increase of power over what would be the case were the two blades operated by direct-acting short handles, as at present.

For tailors' use, my invention will be found valuable, as the cutter, at present, is often obliged to press the blades together with his left hand, in addition to the force exerted by his right hand, in order to obtain sufficient power to cut a plurality of layers of cloth, it being apparent that any desirable amount of power may be applied in my invention by varying the position of the fulcra $o$ $o'$ with respect to the pivot $k$; and my invention is especially valuable to tin and sheet-iron workers, as, in addition to the great power obtained by its cutting-blades, it enables the eye of the workman to be placed directly over the object to be cut, and to easily distinguish the outline of the pattern thereon, which, in the use of the ordinary long-handled shears, is done at great inconvenience, and by forcing the body into an unnatural position.

As before observed, the auxiliary blades $d$ and $g$ form a very useful service for artisans of various trades, to cut wire and other hard substances.

I would remark that, in practice, a spring should be applied, in a convenient position, between the goose-neck e and the lever i, in order to elevate the latter, or to return it to its highest position, after each depression.

I do not claim broadly a shearing-apparatus, composed of a fixed blade, in conjunction with a movable blade, linked to and operated by an independent lever, for I am aware that such has been heretofore used; but What I do claim, and desire to secure by Letters Patent, is—

1. The construction and arrangement of the fixed blade $a$, the post $c$, and goose-neck $e$, the lever $i$, attached to and moving in the slot formed in said goose-neck, and the movable shear-blade, connected with both the post $c$ and lever $i$, as herein shown and set forth.

2. In conjunction with the fixed and movable blades $a$ and $f$, and the lever $i$, arranged as specified, the auxiliary cutting-blades $d$ and $g$, formed in rear of the pivotal point $a'$, the one upon the post $c$, and the other upon the prolongation of the shear $f$, as herein shown and described.

S. W. HUNTINGTON.

Witnesses:
FRED. CURTIS,
EDWARD GRIFFITH.